Patented Mar. 24, 1931

1,797,478

UNITED STATES PATENT OFFICE

PAUL NAWIASKY, OF LUDWIGSHAFEN-ON-RHINE, AND JULIUS MUELLER, OF MANNHEIM, GERMANY, ASSIGNORS TO GENERAL ANILINE WORKS, INC., OF NEW YORK, N. Y., A CORPORATION OF DELAWARE

PRODUCTION OF NEW VAT DYESTUFFS

No Drawing. Original application filed September 22, 1927, Serial No. 221,396, and in Germany October 5, 1926. Divided and this application filed August 4, 1928. Serial No. 297,550.

The present invention relates to the production of new vat dyestuffs.

The subject-matter of this application has been divided out from our copending application for the production of new vat dyestuffs Ser. No. 221,396, filed September 22, 1927, Pat. No. 1,742,317, Jan. 7, 1930.

We have found that valuable new vat dyestuffs are produced by treating with alkaline agents the aminobenzanthrone obtainable by reducing the nitrobenzanthrone described in Example 2 of the U. S. Patent No. 876,679. If, for example, the said aminobenzanthrone be fused with alcoholic potash, a brilliant green dyestuff is obtained. Other vat dyestuffs may be obtained by employing other alkaline agents or varying the conditions with regard to proportions, temperature and the like.

Similar valuable vat dyestuffs, which are often identical with the green dyestuff just described are obtained by treating substitution products of the aforesaid aminobenzanthrone, which contain exchangeable substituents in the Bz-1-position, or the N-acylated derivatives thereof with alkaline agents. The temperature employed for the treatment with alkaline agents will generally range between about 120° and 200° C.

The green dyestuffs prepared according to the methods above described are transformed by the action of oxidizing agents into brown vat dyestuffs of excellent fastness. The brown dyestuffs may be also be produced on the fibre, by treating the dyeings made with the said green dyestuffs with oxidizing agents such as hypochlorites, fast brown dyeings being produced.

Similar brown vat dyestuffs are also obtained in a simple manner by treating the beforementioned nitrobenzanthrone directly with alkaline agents. The resulting dyestuffs may be purified by treatment with oxidizing agents such as hypochlorite.

The following example will serve to further illustrate the nature of the said invention but the invention is not limited to this example. The parts are by weight.

*Example*

10 parts of the nitrobenzanthrone corresponding probably to the formula:

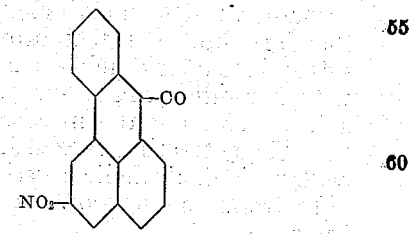

obtainable according to Example 2 of the said U. S. Patent No. 876,679 are introduced into a melt of alcoholic potash, prepared by heating 50 parts of potassium hydroxid with 50 parts of ethyl alcohol. The temperature is maintained at 120° C. for half an hour, and is then gradually raised to 140° C. the alcohol thereby distilling off, and the melt is kept at that temperature until the formation of the dyestuff is completed. The reaction taking place may probably be represented by the following formulæ:

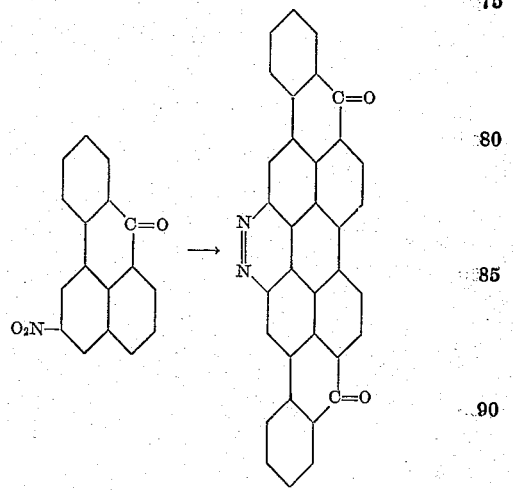

In the melt, however, the dyestuff is present in the form of its leuco compound. When cold, the melt is brought into water, blown with air in order to precipitate the dyestuff which is then filtered off and dried. The resulting dyestuff dissolves to a red-violet solution in concentrated sulfuric acid and gives fast brown dyeings on cotton from the blue vat. A dyestuff of purer shade is obtained by boiling up the crude dyestuff with hypochlorite. The dyeings furnished by this product change into a reddish orange when chlorinated on the fibre.

What we claim is:

1. The process of producing a new valuable brown vat dyestuff which consists in treating the nitrobenzanthrone obtainable by treating benzanthrone with nitric acid in boiling glacial acetic acid, with a caustic alkali.

2. The process of producing a new valuable brown vat dyestuff which consists in treating the nitrobenzanthrone obtainable by treating benzanthrone with nitric acid in boiling glacial acetic acid, with an alcoholic caustic potash melt.

3. As a new article of manufacture the new valuable vat dyestuff which dyes cotton from the dark blue vat fast brown shades, dissolves in sulfuric acid to a violet solution with a reddish tinge, and which is obtainable by treating the nitrobenzanthrone obtainable by treating benzanthrone with nitric acid, with an alcoholic caustic potash melt.

In testimony wherof, we affix our signatures.

PAUL NAWIASKY.
JULIUS MUELLER.